United States Patent [19]

Okawa et al.

[11] Patent Number: 5,175,328

[45] Date of Patent: Dec. 29, 1992

[54] METHOD FOR THE PREPARATION OF ORGANOPOLYSILOXANE

[75] Inventors: Tadashi Okawa; Shuji Yamada, both of Chiba, Japan

[73] Assignee: Dow Corning Toray Silicone Co., Ltd., Tokyo, Japan

[21] Appl. No.: 890,744

[22] Filed: May 28, 1992

[30] Foreign Application Priority Data

May 31, 1991 [JP] Japan ............................ 3-157657

[51] Int. Cl.$^5$ ............................................. C07F 7/08
[52] U.S. Cl. .................................................. 556/451
[58] Field of Search ........................................ 556/451

[56] References Cited

U.S. PATENT DOCUMENTS

| | | | |
|---|---|---|---|
| 2,811,506 | 10/1957 | Coustan | 556/451 X |
| 3,249,585 | 5/1966 | Stark et al. | 556/451 X |
| 3,576,029 | 4/1971 | Haluska | 556/451 |
| 4,816,541 | 3/1989 | Koerner et al. | 516/451 X |
| 5,041,591 | 8/1991 | Okawa | 556/434 |
| 5,097,054 | 3/1992 | Yamamoto et al. | 556/451 |

*Primary Examiner*—Paul F. Shaver
*Attorney, Agent, or Firm*—Arne R. Jarnholm

[57] ABSTRACT

There is disclosed a novel method for the preparation of an organopolysiloxane which has two or three diorganohydrogensiloxy groups at one and only one end of the molecular chain terminal. The method of the invention is particularly useful in that it produces high yields of the desired organopolysiloxane. The method comprises causing a condensation reaction between (A) a hydrogen or lithium terminated polysiloxane and (B) an organopolysiloxane having two or three diorganohydrogensiloxy groups at one terminal of the molecular chain and a halogen at the other terminal of the molecular chain.

7 Claims, No Drawings

METHOD FOR THE PREPARATION OF ORGANOPOLYSILOXANE

BACKGROUND OF THE INVENTION

1. Field of the Invention.

The present invention relates generally to a method for the preparation of organopolysiloxane, and more particularly to a method for the preparation of an organopolysiloxane which carries 2 or 3 diorganohydrogensiloxy groups at one and only one molecular chain terminal.

2. Description of the Prior Art.

Organopolysiloxane carrying the diorganohydrogensiloxy group at only a single molecular chain terminal is employed as starting material for the preparation of organopolysiloxane carrying various types of organofunctional groups at the one molecular chain terminal. The former is also employed as an additive for improving or modifying the physical properties of organic resins.

Organopolysiloxane carrying the diorganohydrogensiloxy group at only one end of the molecular chain has heretofore been prepared by the following methods:

- an ionic equilibration polymerization reaction in the presence of strong acid catalyst of a mixture of diorganohydrogensiloxy-containing organopolysiloxane and diorganohydrogensiloxy-free organopolysiloxane; and
- the ring-opening polymerization of hexaorganocyclotrisiloxane using alkyllithium or lithium silanolate, etc., as initiator, followed by termination of the polymerization with dimethylchlorosilane.

However, the organopolysiloxane afforded by the former method is obtained as a mixture of: (i) organopolysiloxane carrying diorganohydrogensiloxy only at one end of the molecular chain; (ii) organopolysiloxane carrying diorganohydrogensiloxy at both ends of the molecular chain; and (iii) organopolysiloxane lacking diorganohydrogensiloxy at the molecular chain terminals.

On the other hand, the latter method can produce only organopolysiloxane carrying a single diorganohydrogensiloxy group at one end of the molecular chain.

In Japanese Patent Application Number 1-207631 [207,631/89], the present inventors proposed organopolysiloxane carrying 2 diorganohydrogensiloxy groups at only one end of the molecular chain as well as a method for the preparation of same.

However, this preparative method suffers from a low yield of the organopolysiloxane carrying 2 diorganohydrogensiloxy groups at only one end of the molecular chain due to the instability of an intermediate (an organopolysiloxane having 2 hydroxyl groups at only one end of the molecular chain). Furthermore, this preparative method cannot provide organopolysiloxane carrying 3 diorganohydrogensiloxy groups at the one molecular chain terminal.

BRIEF SUMMARY OF THE INVENTION

In accordance with the present invention, there is provided a method for the preparation of organopolysiloxane with the following formula:

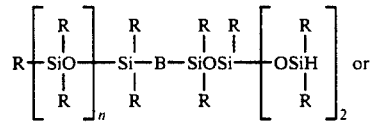

or

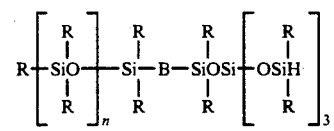

wherein R is a monovalent hydrocarbon group which is free of aliphatically unsaturated bonds and the various R groups may be identical or may differ, B is a divalent hydrocarbon group which is free of aliphatically unsaturated bonds and which contains at least 2 carbon atoms, and n is an integer with a value of one to 200. The method comprises causing a condensation reaction between components (A) and (B) wherein:

(A) is an organosilane or organopolysiloxane with the following formula:

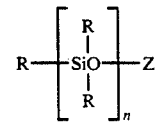

wherein R is a monovalent hydrocarbon group which is free of aliphatically unsaturated bonds and the various R groups may be identical or may differ, Z is the hydrogen atom or lithium atom, and n is an integer with a value of one to 200 and (B) is an organohalosilicone compound having a formula selected from the group consisting of:

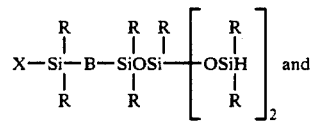 and

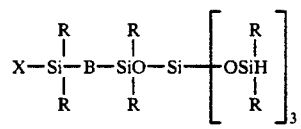

wherein R is a monovalent hydrocarbon group which is free of aliphatically unsaturated bonds and the various R groups may be identical or may differ, B is a divalent hydrocarbon group which is free of aliphatically unsaturated bonds and which contains at least 2 carbon atoms and X is a halogen atom.

It is therefore an object of the present invention to provide a novel method for the preparation of an organopolysiloxane which has 2 or 3 diorganohydrogensiloxy groups at one and only one molecular chain terminal.

DETAILED DESCRIPTION OF THE INVENTION

To explain the preceding in greater detail, the component (A) employed in the present invention comprises organosilane or organopolysiloxane with the following formula:

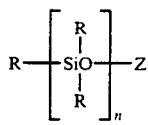

The groups R in the preceding formula comprise one or more species of monovalent hydrocarbon group free of aliphatically unsaturated bonding. Concrete examples in this regard are alkyl groups such as methyl, ethyl, propyl, butyl, pentyl, and hexyl; aryl groups such as phenyl, tolyl, and xylyl; and aralkyl groups such as benzyl and phenethyl. R is preferably methyl. Z represents the hydrogen atom or lithium atom, while n is an integer in the range of 1 to 200, preferably in the range of 1 to 100, and particularly preferably in the range of 5 to 90.

This organosilane or organopolysiloxane comprising component (A) can itself be synthesized by the nonequilibrium polymerization of cyclic hexaorganotrisiloxane with an organoalkali metal compound (e.g., alkyllithium, aryllithium), or with a lithium salt such as lithium triorganosilanolate or alpha-lithiooxydiorganopolysiloxane, or with a partially lithiated organosilanol or alpha-hydroxyorganooligosiloxane. Z represents the hydrogen atom or lithium metal. When Z is hydrogen, this will be an organopolysiloxane having the silanol group at one molecular chain terminal, which can be prepared by treating the alpha-lithiooxyorganopolysiloxane or partially lithiated alpha-hydroxyorganopolysiloxane synthesized as described above with, for example, acetic acid, carbonic acid, or the like.

The organohalosilicone compound comprising the component (B) employed in the present invention's preparative method has a formula selected from the group consisting of

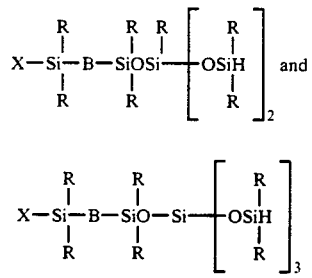

The R groups in this formula comprise one or more species of monovalent hydrocarbon group free of aliphatically unsaturated bonding as described hereinbefore. The group B is a divalent hydrocarbon group free of aliphatically unsaturated bonding and which contains at least two carbon atoms, and is concretely exemplified by ethylene, methylmethylene, propylene, butylene, and hexylene. X is a halogen atom, e.g., fluorine, chlorine, bromine, and iodine, with chlorine being preferred.

The above-described organohalosilicone compound can be prepared by (i) an addition reaction between a silicon compound containing at least one additional diorganohydrogensiloxy group than is desired in the organohalosilicone compound and a halosilicone compound containing aliphatic unsaturation, and (ii) subsequent purification of the 1:1 adduct by distillation. The use of the former in stoichiometric excess over the latter serves to improve the reaction selectivity and afford the 1:1 adduct in higher yields, and preferred stoichiometric ratios fall within the range of 1:1 to 3:1 on an equivalent basis. Group VIII transition metal complex catalysts can be used as catalysts of this addition reaction, and platinum catalysts are particularly preferred in this regard. These platinum catalysts are exemplified by chloroplatinic acid and its alcohol solutions, platinum/olefin complexes, and platinum/vinylsiloxane complexes. This addition reaction may be run in a solventless system, but it is preferably run in a suitable solvent, as exemplified by aromatics such as benzene, toluene, and xylene; aliphatics such as hexane and heptane; ethers such as tetrahydrofuran and diethyl ether; ketones such as acetone and methyl ethyl ketone; esters such as ethyl acetate and butyl acetate; chlorinated hydrocarbons such as carbon tetrachloride, trichloroethane, and chloroform; and dimethylformamide and dimethyl sulfoxide. This addition reaction can be run at room temperature, but in general it is preferably run at temperaturs of approximately 50° to 200° C.

The condensation reaction between the organosilane or organopolysiloxane comprising component (A) and the organohalosilicone compound comprising component (B) is preferably run using at least 1 equivalent and preferably at least 1.05 equivalents of the latter per equivalent of the former. This condensation reaction may be run in a solventless system, but it is preferably run in a suitable solvent, as exemplified by aromatic solvents such as benzene, toluene, and xylene; aliphatic solvents such as hexane and heptane; ether solvents such as tetrahydrofuran and diethyl ether; ketone solvents such as acetone and methyl ethyl ketone; ester solvents such as ethyl acetate and butyl acetate; chlorinated hydrocarbon solvents such as carbon tetrachloride, trichloroethane, and chloroform; and dimethylformamide and dimethyl sulfoxide.

When Z in the organosilane or organopolysiloxane comprising component (A) consists of only the lithium atom, this condensation reaction can be run even at room temperature. However, in the case of a mixture of organopolysiloxane in which Z is hydrogen and organopolysiloxane in which Z is lithium, the reaction is preferably run with the addition of an amine compound (e.g., triethylamine, pyridine, etc.) at 50° to 200° in order to capture the evolved hydrogen chloride and inhibit equilibration depolymerization of the organopolysiloxane chain and accelerate the condensation reaction.

The organopolysiloxane afforded by the method of the present invention has utility as a modifier for organic resins and can also be used as the crosslinker component in curable organopolysiloxane compositions which cure under platinum catalysis.

The present invention is explained in greater detail below through reference and illustrative examples.

REFERENCE EXAMPLE 1

A mixture of 240 mL isopropyl alcohol, 120 mL concentrated hydrochloric acid, and 240 mL water was cooled with ice water to below 10° C. Into this mixture was poured 120.6 g (900 mmol) 1,1,3,3-tetramethyldisiloxane, and 54.4 g (400 mmol) methyltrimethoxysilane was then dripped in. The ice water bath was removed, and the reaction mixture was stirred for 1 hour. The aqueous layer was subsequently discarded, and the organic layer was neutralized by the addition of sodium bicarbonate. After repeatedly washing with water until the aqueous layer reached neutrality, the organic layer was dried over sodium sulfate. Distillation in vacuo then yielded 45.9 g of a fraction at 97°–98° C./83 mmHg. Analysis of this fraction by $^1$H nuclear magnetic resonance analysis (abbreviated below as NMR) and infrared spectrographic analysis (abbreviated below as IR) confirmed it to be methyltris(dimethylsiloxy)silane.

REFERENCE EXAMPLE 2

Tetrakis(dimethylsiloxy)silane was prepared as in Reference Example 1, but in the present case using tetramethoxysilane in place of the methyltrimethoxysilane employed in Reference Example 1.

REFERENCE EXAMPLE 3

Into a stirrer-equipped four-neck flask were introduced 120 g (446.15 mmol) methyltris(dimethylsiloxy)silane and sufficient platinum/tetramethyldivinyldisiloxane complex to afford 20 ppm platinum metal referred to the total weight of the reaction mixture. This was heated to 80° C., 21.5 g dimethylvinylchlorosilane was dripped in, and the reaction mixture was stirred for 1 hour with heating at 90°–100° C. The reaction was assumed to be complete due to the absence of the peak for the starting dimethylvinylchlorosilane in gas chromatographic analysis (abbreviated below as GLC). Distillation in vacuo and collection of the fraction at 89°–91° C./1 mmHg gave 47.6 g product. This product was confirmed to be a chlorosilicone compound (designated as polymer T-1) with the following formula based on the results of NMR and IR analyses.

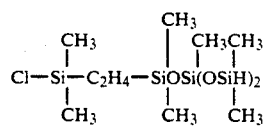

REFERENCE EXAMPLE 4

A chlorosilicone compound with the following formula (designated as polymer T-2) was synthesized by a hydrosilylation reaction between tetrakis(dimethylsiloxy)silane and dimethylvinylchlorosilane as in Reference Example 3.

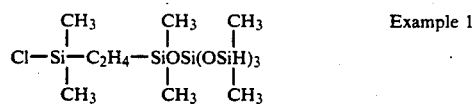

Example 1

EXAMPLE 1

Into a stirrer-equipped four-neck flask were introduced 60 g (270.3 mmol) hexamethylcyclotrisiloxane and 60 g tetrahydrofuran, and the liquid temperature was dropped below 20° C. by cooling with ice water. The n-hexane solution of 32.43 mmol n-butyllithium was introduced with stirring under a dry nitrogen blanket, and this was followed by stirring at room temperature. The course of polymerization was monitored by GLC. The conversion reached 98.4% after 6 hours, and the polymerization was then stopped by the addition first of 0.66 g (6.5 mmol) triethylamine and then 13.89 g (35.68 mmol) polymer T-1 from Reference Example 3. The salt by-product was filtered off, and the solvent and low boilers were removed by distillation in vacuo with heating to afford a colorless, transparent polymer. This was confirmed to be dimethylpolysiloxane with the following formula based on analysis by NMR, IR, and gel permeation chromatography (GPC) and iodometric determination of SiH group content (wt %).

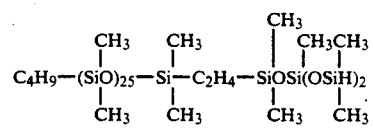

EXAMPLE 2

Into a stirrer-equipped four-neck flask were introduced 420 g (1981.9 mmol) hexamethylcyclotrisiloxane and 420 g tetrahydrofuran, and the liquid temperature was dropped below 20° C. by cooling with ice water. The n-hexane solution of 119.19 mmol n-butyllithium was introduced with stirring under a dry nitrogen blanket, and this was followed by stirring at room temperature. The course of polymerization was monitored by GLC. The conversion reached 99.0% after 6 hours, and the polymerization was then stopped by the addition first of 2.3 g (22.72 mmol) triethylamine and then 46.91 g (119.19 mmol) polymer T-1 from Reference Example 3. The salt by-product was filtered off, and the solvent and low boilers were removed by distillation in vacuo with heating to afford a colorless, transparent polymer. This was confirmed to be dimethylpolysiloxane with the following formula based on analysis by NMR, IR, and GPC and iodometric determination of SiH group content (wt %).

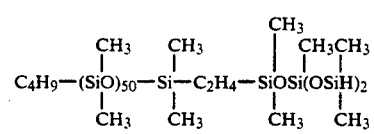

EXAMPLE 3

Into a stirrer-equipped four-neck flask were introduced 60 g (270.3 mmol) hexamethylcyclotrisiloxane and 60 g tetrahydrofuran, and the liquid temperature was dropped below 20° C. by cooling with ice water. The n-hexane solution of 16.22 mmol n-butyllithium was introduced with stirring under a dry nitrogen blanket, and this was followed by stirring at room temperature. The course of polymerization was monitored by GLC. The conversion reached 99% after 6 hours, and the polymerization was then stopped by the addition first of 0.22 g (2.17 mmol) triethylamine and then 4.63 g (11.89 mmol) polymer T-1 from Reference Example 3. The salt by-product was filtered off, and the solvent and low boilers were removed by distillation in vacuo with heating to afford a colorless, transparent polymer. This was confirmed to be dimethylpolysiloxane with the following formula based on analysis by NMR, IR, and GPC and iodometric determination of SiH group content (wt %).

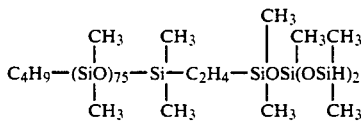

EXAMPLE 4

The following were introduced into a stirrer-equipped four-neck flask: 60 g (31.4 mmol) polydimethylsiloxane with the following formula

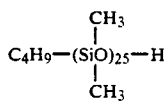

5.1 g (50.49 mmol) triethylamine, and 60 mL toluene. Polymer T-1 (13.1 g, 33.6 mmol) was dripped in, and this addition was followed by stirring for 24 hours at room temperature and then stirring for 3 hours at 50° C. The salt by-product was subsequently filtered off, and the solvent and low boilers were distilled off in vacuo with heating to give a colorless, transparent dimethylpolysiloxane with the following formula.

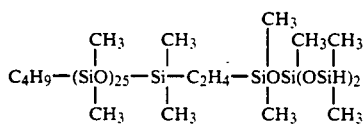

Example 5

EXAMPLE 5

Into a stirrer-equipped four-neck flask were introduced 60 g (270.3 mmol) hexamethylcyclotrisiloxane and 60 g tetrahydrofuran, and the liquid temperature was dropped below 20° C. by cooling with ice water. The n-hexane solution of 32.43 mmol n-butyllithium was introduced with stirring under a dry nitrogen blanket, and this was followed by stirring at room temperature. The course of polymerization was monitored by GLC. The conversion reached 98.4% after 6 hours, and the polymerization was then stopped by the addition first of 0.66 g (6.5 mmol) triethylamine and then 13.32 g (35.68 mmol) polymer T-2. The salt by-product was filtered off, and the solvent and low boilers were removed by distillation in vacuo with heating to afford a colorless, transparent polymer. This was confirmed to be dimethylpolysiloxane with the following formula based on analysis by NMR, IR, and GPC and iodometric determination of SiH group content (wt %).

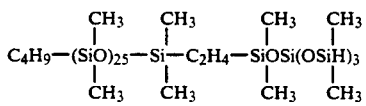

The method of the present invention is characterized by the highly productive preparation of organopolysiloxane having 2 or 3 diorganohydrogensiloxy groups at one molecular chain terminal.

What is claimed is:

1. A method for the preparation of organopolysiloxane having a formula selected from the group consisting of:

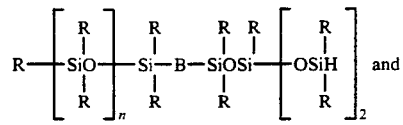

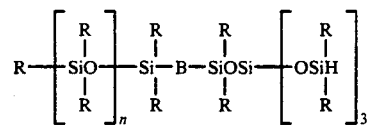

wherein R is a monovalent hydrocarbon group which is free of aliphatically unsaturated bonds and the R groups may be identical or may differ, B is a divalent hydrocarbon group which is free of aliphatically unsaturated bonds and which contains at least 2 carbon atoms, and n is an integer with a value of one to 200), said method comprising the step of: causing a condensation reaction between component (A) and component (B), wherein:

(A) is an organosilane or organopolysiloxane with the following formula

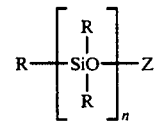

wherein R is a monovalent hydrocarbon group which is free of aliphatically unsaturated bonds and the R groups may be identical or may differ, Z is the hydrogen atom or lithium atom, and n is an integer with a value of one to 200 and (B) is an organohalosilicone compound having a formula selected from the group consisting of:

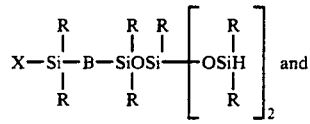

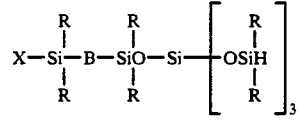

wherein R is a monovalent hydrocarbon group which is free of aliphatically unsaturated bonds and the R groups may be identical or may differ, B is a divalent hydrocarbon group which is free of aliphatically unsaturated bonds and which contains at least 2 carbon atoms and X is a halogen atom.

2. A method in accordance with claim 1 wherein one or more of the R groups of component (A) are chosen from the group consisting of: methyl, ethyl, propyl, butyl, pentyl, hexyl, phenyl, tolyl, xylyl, benzyl and phenethyl.

3. A method in accordance with claim 2 wherein the R groups of component (A) are methyl.

4. A method in accordance with claim 1 wherein said condensation reaction is carried out in a solvent.

5. A method in accordance with claim 1 wherein the B group of component (B) is selected from the group consisting of: ethylene, methylmethylene, propylene, butylene and hexylene.

6. A method in accordance with claim 1 wherein X is chlorine.

7. A method in accordance with claim 1 wherein the molar ratio of component (A) to component (B) is greater than or equal to 1.05.

* * * * *